United States Patent
Newman

[11] Patent Number: 6,134,800
[45] Date of Patent: Oct. 24, 2000

[54] ROUTER SETBACK GAUGE

[76] Inventor: Roger R. Newman, 20 Lytton Boulevard, Toronto, Ontario, Canada, M4R 1L1

[21] Appl. No.: 09/207,759

[22] Filed: Dec. 9, 1998

[51] Int. Cl.⁷ .............................. B23B 49/00; B27C 5/00
[52] U.S. Cl. ...................................... 33/636; 144/144.51
[58] Field of Search .......................... 33/562, 626–643, 33/501.45; 144/135.2, 135.3, 137, 139, 144, 144.1, 144.51, 144.52, 371, 372

[56] References Cited

U.S. PATENT DOCUMENTS

| | | | |
|---|---|---|---|
| D. 351,774 | 10/1994 | Witt | D8/71 |
| 817,991 | 4/1906 | Ross | 33/43 |
| 3,734,151 | 5/1973 | Skripsky | 144/1 R |
| 3,964,170 | 6/1976 | Zdarsky | 33/169 B |
| 3,967,665 | 7/1976 | Lund | 144/144.5 R |
| 3,985,168 | 10/1976 | Lundquist | 144/144.5 GT |
| 4,035,099 | 7/1977 | Eriederichs et al. | 408/103 |
| 4,095,633 | 6/1978 | Kimball et al. | 144/144 R |
| 4,168,730 | 9/1979 | Keller | 144/144 R |
| 4,215,731 | 8/1980 | Maynard | 144/136 C |
| 4,290,464 | 9/1981 | Marsan | 144/136 C |
| 4,291,735 | 9/1981 | Silken | 144/134 R |
| 4,465,114 | 8/1984 | Schumacher | 144/286 R |
| 4,527,605 | 7/1985 | Ede et al. | 144/286 R |
| 4,605,048 | 8/1986 | Swartout et al. | 144/136 B |
| 4,749,013 | 6/1988 | Ducate, Sr. | 144/145 R |
| 4,753,531 | 6/1988 | Hiratsuka et al. | 356/246 |
| 4,843,728 | 7/1989 | Francis | 33/42 |
| 5,016,358 | 5/1991 | Rice et al. | 33/569 |
| 5,090,461 | 2/1992 | Gaghar et al. | 144/136 C |
| 5,273,090 | 12/1993 | Klemma | 144/134 R |
| 5,345,986 | 9/1994 | Kieffer | 144/372 |
| 5,375,951 | 12/1994 | Veale | 409/131 |
| 5,396,937 | 3/1995 | Clausen | 144/134 R |
| 5,458,171 | 10/1995 | Ward | 144/84 |
| 5,533,556 | 7/1996 | Whitney | 144/144.52 |
| 5,630,455 | 5/1997 | Julien | 144/372 |
| 6,039,095 | 3/2000 | Newman | 144/144.52 |
| 6,061,921 | 5/2000 | Adams et al. | 33/638 |
| 6,068,036 | 5/2000 | Cassidy | 144/134.1 |

OTHER PUBLICATIONS

Spielman, P., *The New Router Handbook* (New York: Sterling Publishing Co., 1993) pp. 126, 128 and 129.
Spielman, P., *Router Jigs and Techniques* (New York: Sterling Publishing Co., 1988) pp. 207, 208, 212, 213 and 214.

Primary Examiner—G. Bradley Bennett
Assistant Examiner—Gail Verbitsky
Attorney, Agent, or Firm—Bereskin & Parr

[57] ABSTRACT

A setback gauge for use with a router, a fence and a workpiece, the router having a base, an edge on the base for guiding the router, and a router bit extending out from said base for rotation about a router axis. The setback gauge comprises a substantially rectangular plate wherein the length of the rectangular plate defines a first setback distance and the width of the rectangular plate defines a second setback distance. The first setback distance is equal to the distance from the router axis to the edge of the base plus one-half of the cutting diameter of the router bit and defines the setback distance for cuts inside the cutting line. The second setback distance is equal to the distance from the router axis to the edge of the base less one-half of the cutting diameter of the router bit and defines the setback distance for cuts outside the cutting line. A set of setback gauges includes a plurality of identical pairs of setback gauges for use with various common router bit cutting diameters.

14 Claims, 8 Drawing Sheets

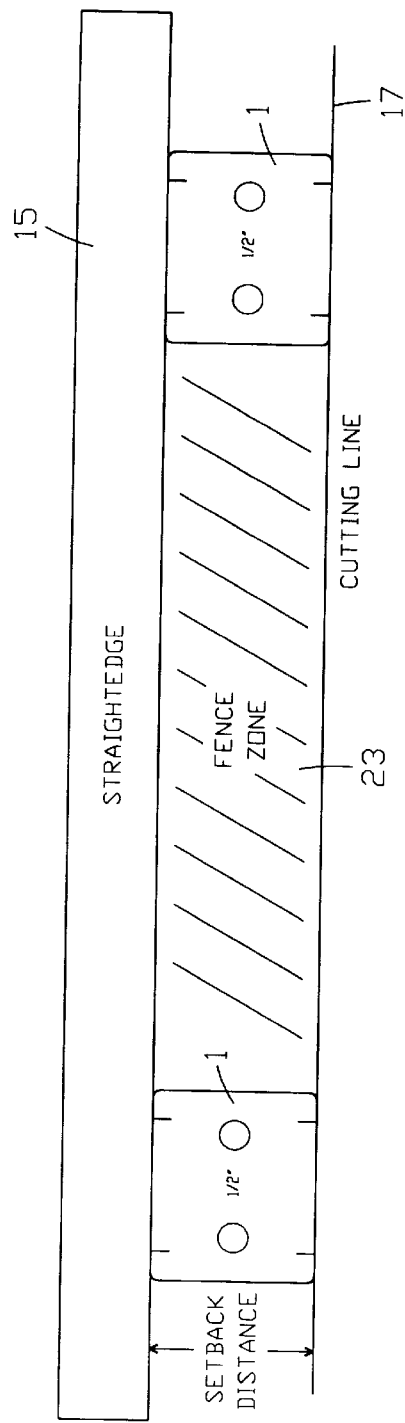
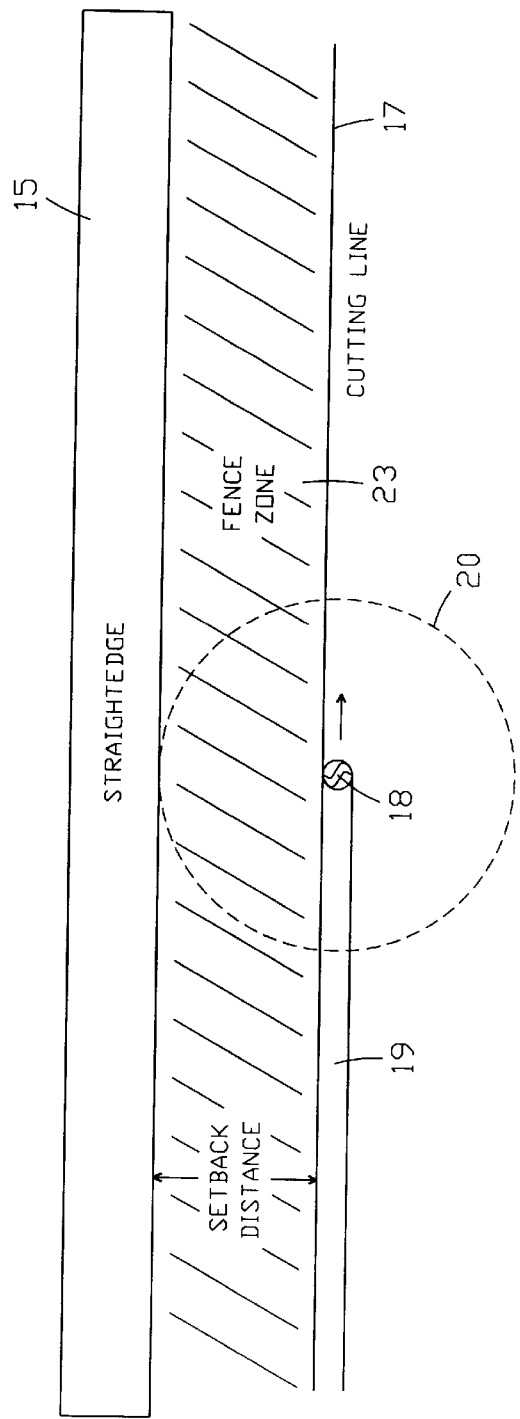

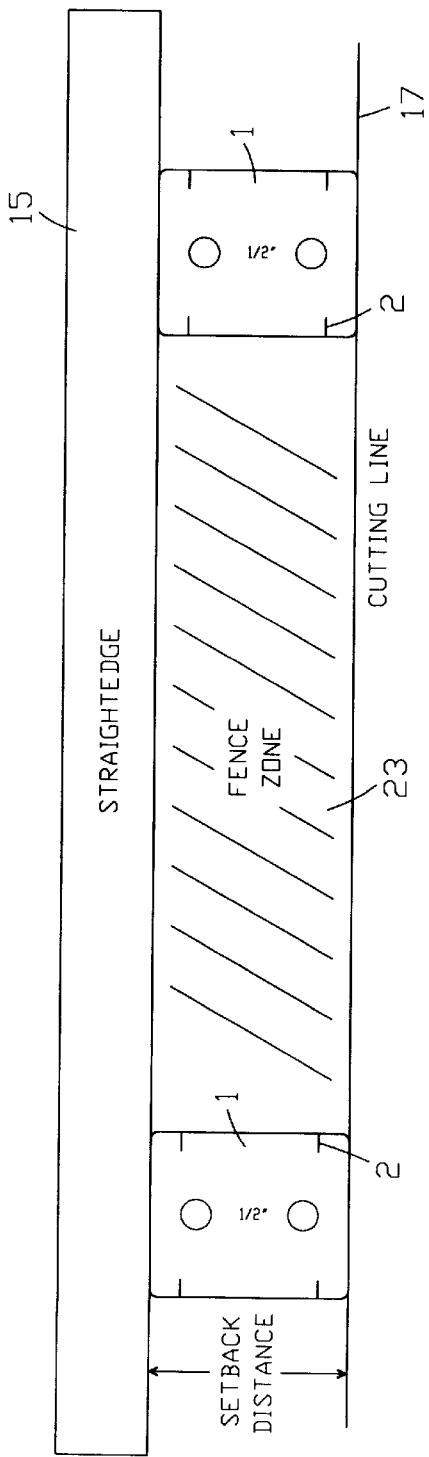
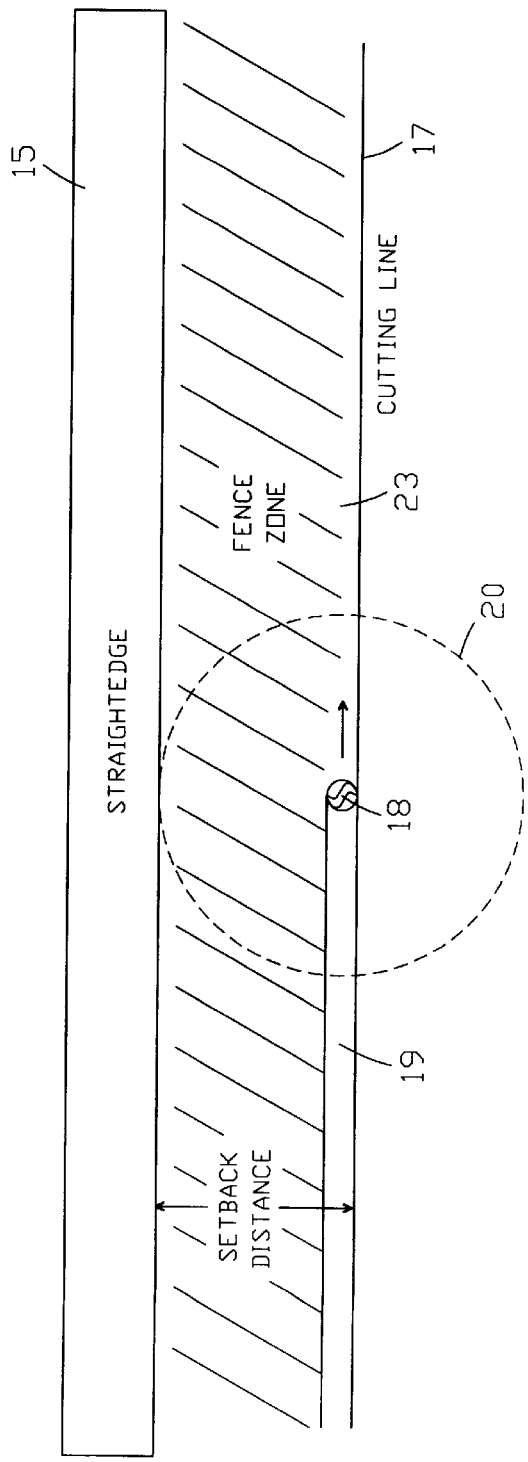

ROUTER SETBACK GAUGE

FIELD OF THE INVENTION

This invention relates to a setback gauge for use with a portable router to enable the position of a fence or a straightedge to be set quickly and accurately so that a router bit is guided along a desired cutting line.

BACKGROUND OF THE INVENTION

The portable router is a versatile tool that is often underemployed. One important capability of the router that is not generally recognized or used is its ability to perform tasks that would normally be performed by a saw. The advantages of using a router instead of a saw include a more precise and finished edge on the cuts in the workpiece. Although routing may be initially slower than using a saw, the finished edge may save a further finishing step which may be required if a saw is used.

When routing a straight groove or a slot in a workpiece, a cutting line is first drawn on the workpiece to indicate where the groove or slot is to be cut. In order to guide a router bit along the cutting line, a fence or a straightedge is set parallel to and at a measured distance away from the cutting line and is then clamped or otherwise secured to the workpiece. A router is then guided along the straightedge. The measured distance is set so that the router bit cuts along the cutting line, as explained in further detail below. The minimum width of the resulting groove or slot is of course the cutting width or diameter of the router bit.

Conventionally, the groove or slot is cut along the cutting line on the side opposite the straightedge (this type of cut is referred to in this specification including the claims as an "outside" cut). Cutting the groove or slot along the cutting line on the same side as the fence or straightedge (this type of cut is referred to in this specification including the claims as an "inside" cut) is generally neither practiced, nor recognised in this field.

For an outside cut, the fence or straightedge will be clamped onto the workpiece at a distance away from the cutting line equal to the distance between the cutting edge of the router bit and the outer edge of the router base or, equivalently, the distance from the router axis of rotation to the edge of the router base less one-half the cutting diameter of the router bit. For example, for a router bit with a cutting diameter of ½-inch and a router having a circular base of 6-inch diameter, the proper setback distance for an outside cut would be 2 and ¾-inches. This distance is commonly called the "offset" distance in the literature. However, a better term to use would be "setback" distance since the straightedge is "set" at a specific distance "back" from the cutting line.

The proper setback distance can be determined for each routing situation by measuring between the cutting edge of the router bit and the outer edge of the router base using a ruler or similar measuring implement. Typically, this measurement is then transferred to the workpiece by means of a measuring stick or ruler and is used to position a straightedge at the proper setback distance from the cutting line.

Alternatively, and less commonly, the fence or straightedge is positioned by using custom made spacers or gauges to directly measure a proper setback distance for a given router bit cutting diameter and a router base dimension. Examples of such spacers or setback gauges are found in the literature including Spielman, P., *The New Router Handbook* (New York: Sterling Publishing Co., 1993) at pp. 126, 128 and 129; and Spielman, P., *Router Jigs and Techniques* (New York: Sterling Publishing Co., 1988) at pp. 207, 208, 212, 213 and 214. These spacers are pre-cut from a suitable material to a width that matches the setback distance required for an outside cut for a specific router bit and router base.

A prior art spacer is used by placing one edge of the spacer along the cutting line and butting a straightedge along the opposite side of the spacer. Once the straightedge is in position, it is clamped or otherwise secured to the workpiece so that the straightedge may act as a stable guide for the router; the spacer is then removed.

A variation on the prior art spacer is a hinged spacer which comprises two flaps—a base flap and a spacer flap—hinged together along a lengthwise edge. The hinged spacer is illustrated in Spielman, P., *Router Jigs and Techniques* (New York: Sterling Publishing Co., 1988) at p. 207. The width of the spacer flap is equal to the distance from the router axis of rotation to the edge of the router base less one-half the cutting diameter of the router bit (i.e., the proper setback distance for an outside cut). The width of the base flap is undefined. In operation the hinged spacer measures a proper setback distance for an outside cut by lining up, in unfolded position, the free (i.e. unhinged) edge of the spacer flap against a cutting line on a workpiece, then folding the spacer flap onto the top of the base flap. A straightedge is formed by the hinged edge of the base flap. A router guided along the hinged edge of the base flap will thus perform an outside cut along the cutting line.

While these prior art spacers are appropriate for use in some routing situations, it is sometimes inconvenient or simply not possible to perform a desired outside cut using them. For example, when a cutting line is drawn to designate the outer edge of a panel that is to be cut from a large sheet of material, that panel can be cut by means of outside cuts if the panel is wide enough to enable a fence or straightedge to be clamped onto it for routing an outside cut. However, if the desired panel is not wide enough for the fence or straightedge to be clamped onto it, then an unconventional inside cut can be used, as detailed further below. In addition, because of their relative bulk, the prior art spacers are difficult and unwieldy to use in tight work spaces or on smaller workpieces. Furthermore, customizing and storing a complete set of these prior art spacers for common router bit cutting diameters may be expensive and impractical, particularly as such spacers are commonly provided as a single, long spacer.

SUMMARY OF THE INVENTION

The present invention provides a router setback gauge, designed for use with a specified router bit cutting diameter and router base dimension, which can be used to position a straightedge for a conventional outside cut or an unconventional inside cut proposed by the present invention.

In a first aspect, the present invention provides a router setback gauge for use with a router, a straightedge and a workpiece, the router having a base and a router bit extending out from the base for rotation about a router axis, the router setback gauge comprising a substantially rectangular plate wherein the length of the rectangular plate between first edges of the rectangular plate defines a first setback distance and the width of the rectangular plate between second edges of the rectangular plate defines a second setback distance, the first setback distance being equal to the distance from the router axis to the edge of the router base plus one-half the cutting diameter of the router bit, for defining the setback distance for cuts inside the cutting line, and the second setback distance being equal to the distance from the router axis to the edge of the router base less one-half the cutting diameter of the router bit, for defining the setback distance for cuts outside the cutting line.

In a second aspect, the present invention provides an anti-parallax attachment for a workpiece which lies at a lower plane than the router base, the anti-parallax attachment comprising one of: an attachment which attaches to an edge of the setback gauge and which vertically extends the edge of the setback gauge; and an attachment which is placed on the workpiece to vertically extend the cutting line at least to a horizontal plane on which the router base will lie in use.

In a third aspect, the present invention provides a set of setback gauges comprising a plurality of setback gauges for use with routers having a common dimension for the distance between the router axis and the edge of the router base, wherein the first setback distance and second setback distance vary according to the cutting diameter of the router bit, and wherein the set of setback gauges includes setback gauge sizes for common router bit diameters.

In a fourth aspect, the present invention provides a method of performing cuts on a workpiece using a router, the router having a base, an edge on the base for guiding the router, and a router bit extending out from said base for rotation about a router axis, the method comprising the steps of: (i) providing a setback gauge, the setback gauge comprising a substantially rectangular plate wherein the length of said rectangular plate between first edges of the rectangular plate defines a first setback distance and the width of said rectangular plate between second edges of the rectangular plate defines a second setback distance, the first setback distance being equal to the distance from the router axis to the edge of said base plus one-half of the cutting diameter of the router bit, and defining the setback distance for cuts inside a cutting line, and the second setback distance being equal to the distance from the router axis to the edge of said base less one-half of the cutting diameter of the router bit, for defining the setback distance for cuts outside a cutting line; (ii) selecting a proper setback gauge corresponding to the cutting diameter of said router bit and the router base dimension; (iii) setting a proper setback distance for a straightedge, by positioning a first edge of the setback gauge on the cutting line for a cut inside the cutting line, or positioning a second edge of the setback gauge on the cutting line for a cut outside the cutting line, then butting the straightedge against said first or second edge opposite the edge positioned on said cutting line; and (iv) clamping down or otherwise securing the straightedge on said workpiece so as to provide a stable guide for said router.

It is anticipated that the invention will be applicable to routers having a circular base, so that angular orientation of the router has no effect. However, the invention is also applicable to routers having non-circular bases, e.g. routers with straight side surfaces, for sliding abutment against a straightedge. The distance to the edge of the router base would then be measured along a line perpendicular to a straight side surface of the router base.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention.

FIG. 5 shows a top view of a pair of identical setback gauges as shown in FIG. 1 being used to position a straightedge for an outside cut;

FIG. 6 shows a top view of a straightedge positioned as in FIG. 5 being used to guide a router bit along the outside of the cutting line;

FIG. 7 shows a top view of a pair of identical setback gauges as shown in FIG. 1 being used to position a straightedge for an inside cut;

FIG. 8 shows a top view of a straightedge positioned as in FIG. 7 being used to guide a router bit along the inside of the cutting line;

DETAILED DESCRIPTION OF THE INVENTION

The setback gauge of the present invention is a substantially rectangular plate which is preferably either precisely cut from a material of a suitable thickness, or precision molded out of plastic. The setback gauge can be used individually or in identical pairs for accurately positioning straightedges and fences of virtually any length into the required setback positions for all kinds of routing work using hand routers.

Figure 1:
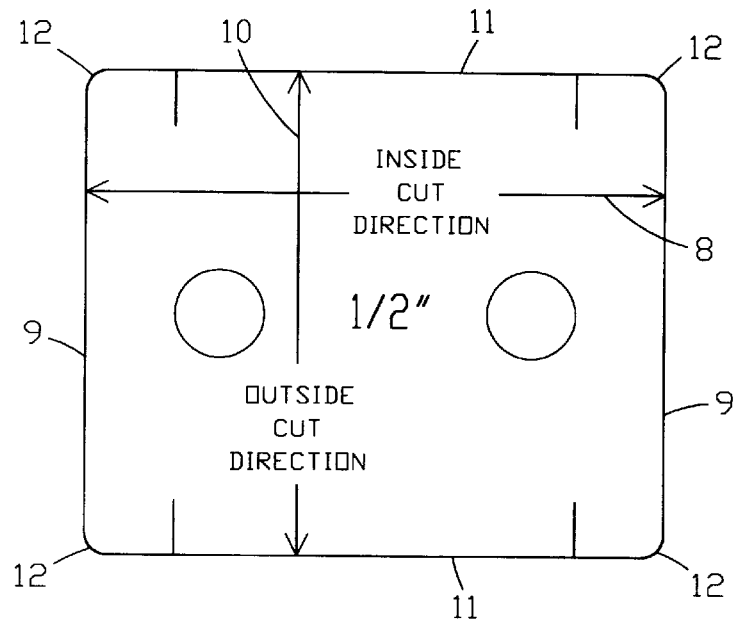
FIG. 1 shows a top view of a setback gauge indicating the outside cut and inside cut directions.
Figure 2A:
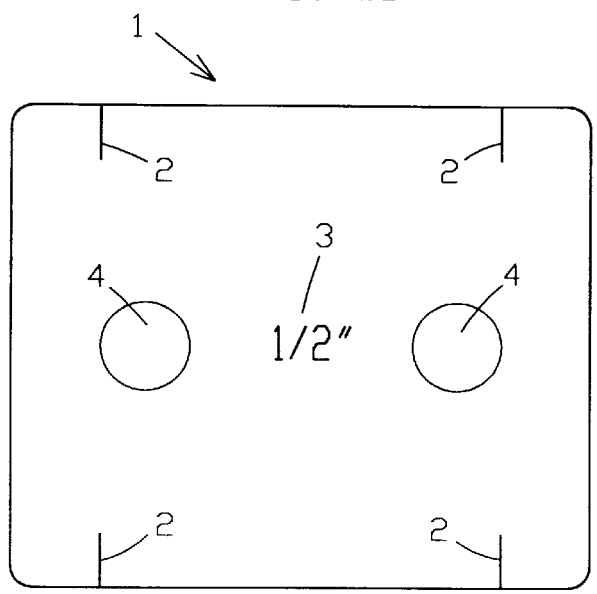
FIG. 2A shows another top view of the setback gauge of FIG. 1.

FIGS. 1 and 2A show top views of the preferred embodiment of the present invention. Each setback gauge 1 includes alphanumeric identification means 3 for identifying the router bit size or cutting diameter with which the setback gauge is to be used (for example, ½-inch, as illustrated in FIG. 2A). Each setback gauge optionally includes supplemental identification means 4 comprising one or more circular holes having a diameter substantially equal to the cutting diameter of the router bit with which the setback gauge is to be used, to enable identification of the correct setback gauge to be made, simply by fitting a router bit into one of the holes 4. In addition, each setback gauge optionally includes corner lines 2 parallel to and one router bit cutting diameter away from the first edges 9 of the setback gauge. When the setback gauge is used for inside cuts, these corner lines 2 assist the user in determining the width of the groove or slot which will be cut. Furthermore, the corners 12 are rounded so as to minimize the chance of cuts and scrapes while handling the setback gauges.

Additionally, both the supplemental identification means 4 and the corner lines 2 may assist the user in determining the proper orientation of the setback gauge 1 for an inside cut or an outside cut. This is particularly useful for setback gauges 1 designed for use with smaller router bit cutting diameters as the difference between the length and the width of the setback gauge 1 would not be as readily apparent as for setback gauges 1 designed for larger cutting diameters.

Figure 2C:
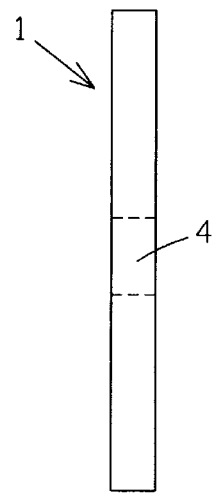
FIG. 2C shows a corresponding side view of the setback gauge of FIG. 1.
Figure 2B:
FIG. 2B shows a corresponding front view of the setback gauge of FIG. 1.

FIG. 2B shows a front view of the setback gauge of FIG. 2A. The circular holes 4 are shown in hidden view. The thickness of the setback gauge as shown in FIG. 2B is not critical, and may be of any suitable thickness, say for example ¼-inch, which will allow a straightedge to be butted up against the edge of the setback gauge.

FIG. 2C shows a side view of the setback gauge of FIG. 2A. The circular holes 4 are again shown in hidden view.

As indicated in FIG. 1, the width 10 of the setback gauge 1 defines the proper setback distance for a conventional outside cut. The length 8 of the setback gauge defines the proper setback for an unconventional inside cut, as taught by the present invention. The length 8 is defined between first edges 9, while the width 10 is defined between second edges 11.

Figure 3:
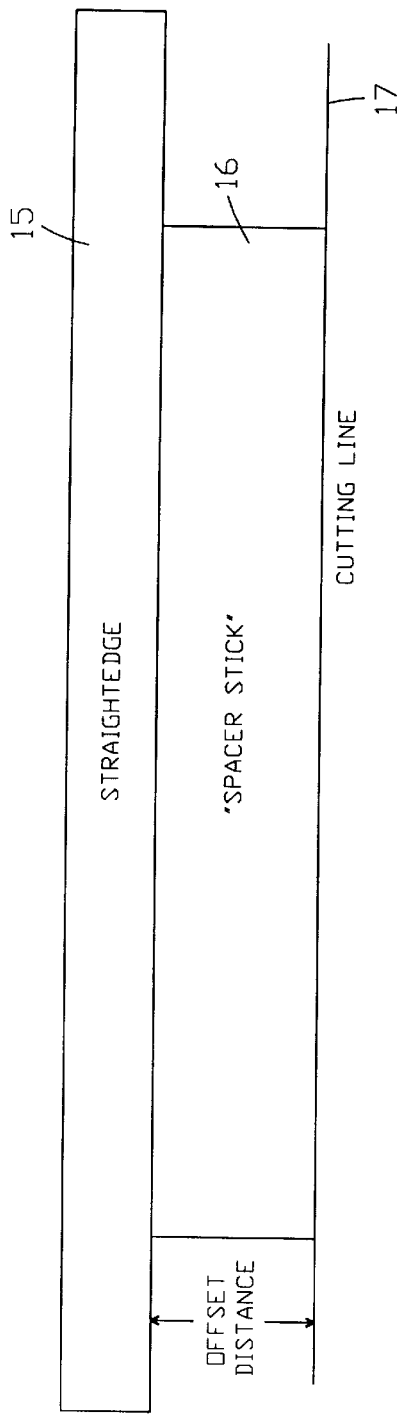
FIG. 3 shows a top view of a prior art spacer being used to position a straightedge for an outside cut.

FIG. 3 shows a top view of a prior art spacer 16 being used to set a straightedge 15 a specific offset (setback) distance away from the cutting line 17. The straightedge 15 is typically clamped down or otherwise secured to the workpiece to act as a stable guide.

Figure 4:
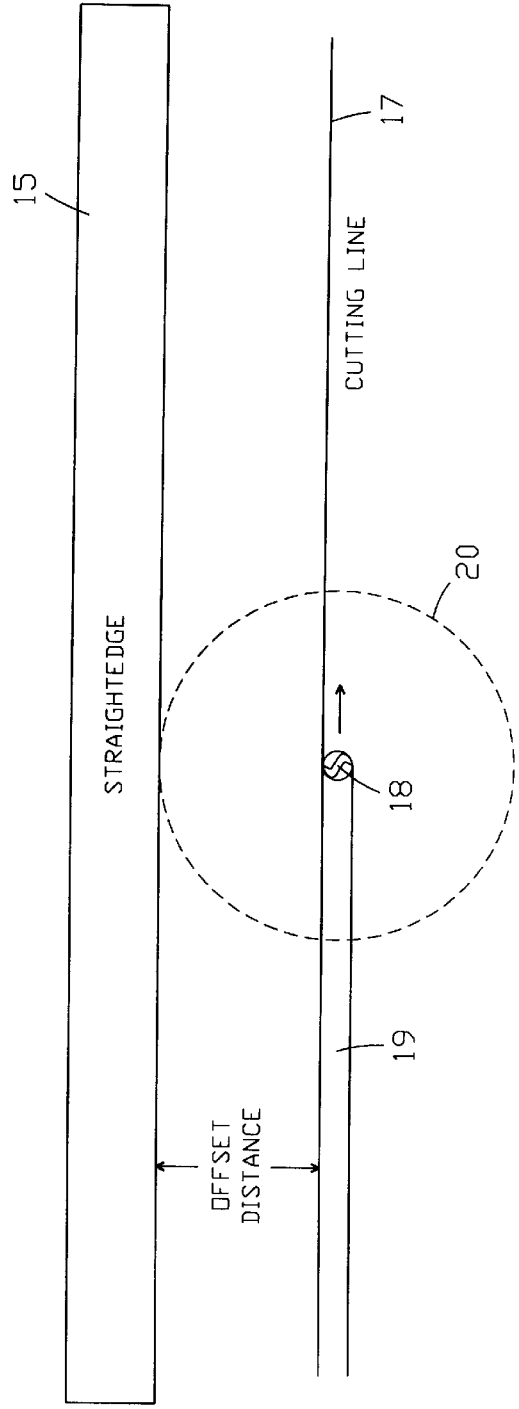
FIG. 4 shows a top view of a straightedge positioned by the prior art spacer of FIG. 3 being used to guide a router bit along the outside of the cutting line.

FIG. 4 shows a top view of groove 19 being cut along the outside of the cutting line 17 using router bit 18. The prior art spacer 16 of FIG. 3 has been removed after clamping down the straightedge 15. The router base 20 shown in dotted outline is guided along a guiding edge of the straightedge 15 and, accordingly, router bit 18 is guided along the outside of cutting line 17. As indicated and as commonly the case, the router is shown with a circular base 20; all of the discussion in this specification and the claims generally assumes a circular base, although a router with a non-circular base could be used. For example a straight or flat side base could be used with the straightedge set accordingly.

Also shown in FIG. 4 is the conventional left-to-right direction of a router cut. This direction of cut causes the router to tend to move in towards the straightedge, thus aiding in obtaining a clean cut. In known manner, the substantially cylindrical router bit rotates clockwise. As the cutting side of the bit is on the right hand side, as viewed in FIG. 4, the router is thus urged or pressed against the straightedge 15. Thus, FIG. 4 shows a conventional cut, which the present invention classifies as an outside cut.

FIG. 5 shows a top view of a pair of identical setback gauges 1, according to the present invention, being used to position and clamp down a straightedge 15 at a proper distance away from the cutting line 17. While the setback gauges are preferably used in pairs for longer cutting lengths, it is possible to use one setback gauge only for shorter cutting lengths or where the work space is limited. Note that the setback gauges 1 here are being used widthwise, or in the outside cut direction (i.e.) with the width 10 (shown in FIG. 1) extending perpendicularly between the straightedge 15 and the cutting line 17. The area between the straightedge and the cutting line may be thought of as being the fence zone 23. A conventional outside cut is a groove cut by the router that is on the side of the cutting line 17 that is outside of the fence zone 23.

As shown in FIG. 6, the pair of setback gauges 1 of FIG. 5 has been removed after clamping down straightedge 15. The edge of router base 20 is guided along the straightedge 15 and, accordingly, router bit 18 is guided along the outside of cutting line 17 to cut groove 19 outside of the fence zone 23.

One of the techniques taught by the present invention is to use a router to provide a cutting action (herein referred to as router cutting) which can be used as an alternative method for the cutting of various panels from large sheet materials. This is a task that is normally performed by a saw (usually a jigsaw) and the resulting panels would then have to have their edges sanded, planed or routed in order to make the edges straight and clean.

When the panels are routercut from large sheet materials instead of being sawn, the resulting panels would have cut edges that are already straight and clean, thus avoiding the necessity for any further finishing steps. In addition the dimensions of the resulting panels would be more precise than the sawn panels.

Router cutting can be performed using the conventional outside cuts provided that the panel being cut is large enough to allow the straightedge to be set back and then clamped onto it. However, if the panel to be cut is not large enough to allow the straightedge to be set back and then clamped onto it, then instead the straightedge can be set back on the other side of the cutting line and then clamped on to the large sheet material that the panel is being cut from. In this case the router cutting would be performed using the unconventional inside cuts.

Referring now to FIG. 7, there is shown a top view of a pair of setback gauges 1 of the present invention being used to position and clamp a straightedge 15 at a proper setback distance away from the cutting line 17. For this purpose, the setback gauges 1, in FIG. 7, are positioned lengthwise, for an inside cut, i.e. with the length 8 (shown in FIG. 1) extending perpendicularly between the cutting line 17 and the straightedge 15.

In FIG. 8, the pair of identical setback gauges 1 of FIG. 7 has, as before, been removed after clamping down straightedge 15. The edge of router base 20, again circular, is being guided along the straightedge 15 and the router bit 18 is guided along the inside of cutting line 17 to cut groove 19 inside of the fence zone 23. This type of cut inside the cutting line 17 is generally not known. However, the present inventor has realised that such a cut is very useful or necessary in certain situations.

Also shown in FIG. 8 is the conventional left-to-right direction of the router along the guiding edge of straightedge 15 and the resulting cut causes the router to tend to move in towards the straightedge. (The direction is left to right when viewing the guiding edge of the straightedge and the router is urged away from the viewer and against the guiding edge of the straightedge.) The router bit shown in FIG. 8, cuts in a clockwise direction.

Advantageously, an inside cut lessens the risk of breakouts or splintering (small pieces of wood breaking off from the workpiece rather than being cut cleanly). This advantage is attributable to the inward-cutting action of the blade along the cutting line when an inside cut is used, as opposed to an outward-cutting action along the cutting line for a conventional outside cut.

Now, as compared to an outside cut, an inside cut has the advantage that the action of the router bit is to apply a compressive load to the material adjacent the cutting line 17, thereby virtually eliminating the possibility of a breakout, provided the router is handled carefully.

For general routing or for router cutting as proposed by the present invention, after a cutting line has been set on a workpiece, the fence or straightedge can be set back and clamped on either side of the cutting line prior to routing. In both cases, the groove or routercut can then be made on either side of the cutting line depending on whether the fence or the straightedge was set back using the setback gauges in the outside cut direction or the inside cut direction.

Many routing situations exist which require that the fence or straightedge be mounted completely off the workpiece, and in these situations, this would only be possible if one of the inventor's related inventions (subject of various applications filed simultaneously herewith) is used to effectively provide a fence or straightedge rigidly held and spaced off the workpiece.

Of particular value is the inside cut which can be used for routing tongues, tenons, rabbets, and the like, in an efficient and precise manner, and without the risk of any breakouts or splintering on the workpiece. Breakouts are not usually a problem for most routing work, but for some routing situations, in particular when routing into the end grain of workpieces, the risk of causing breakouts when using the conventional outside cuts is so great that such routing would normally be considered impractical. However, due to the inward-cutting action employed when making inside cuts, these breakout problems are virtually eliminated for these routing situations and such routing can now be done with confidence using inside cuts.

Figure 9A:
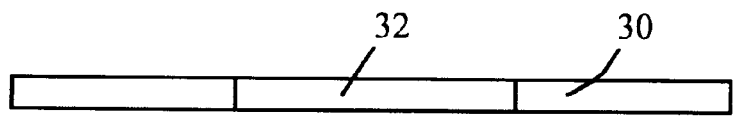
FIG. 9A shows a top view of the index tab of FIG. 9B.
Figure 9B:
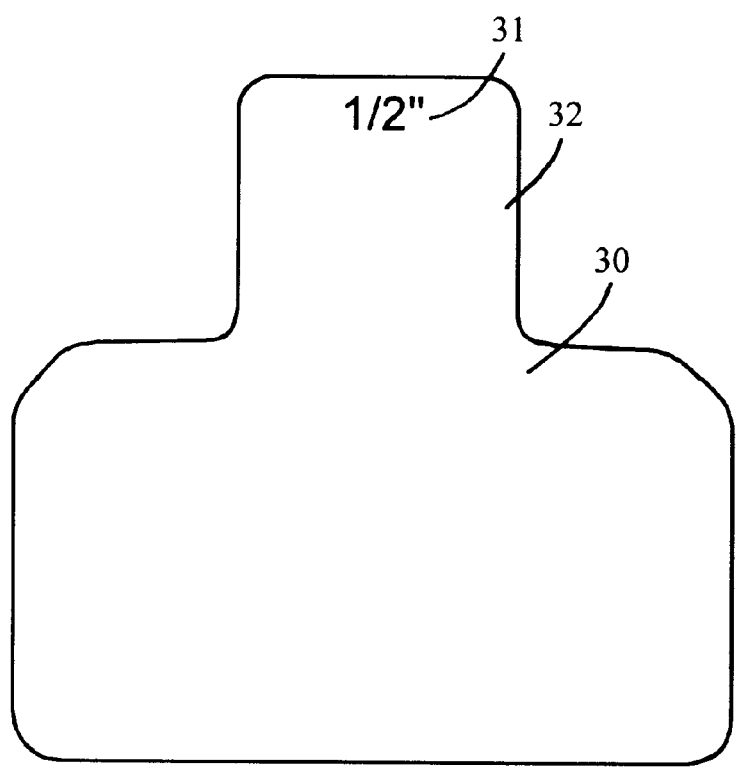
FIG. 9B shows a front view of a typical index tab for indexing a set of setback guides.
Figure 9C:
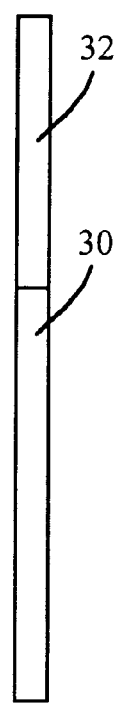
FIG. 9C shows a corresponding side view of the index tab of FIG. 9B.

Now referring to FIG. 9B, a front view of a typical index tab 30 is shown which may be used to separate and index a complete set of setback gauges. Typically a set of setback gauges will comprise a plurality of identical pairs of setback gauges for use with routers having a common dimension for the distance between the router axis and the edge of the router base. For example, a set of setback gauges may comprise identical pairs of setback gauges for use with a router having a base diameter of 6-inches, and for common router bit cutting diameters of ⅛-inch, ³⁄₁₆-inch, ¼-inch, ⁹⁄₃₂-inch, ⁵⁄₁₆-inch, ⅜-inch, ⁷⁄₁₆-inch, ½-inch, ⁹⁄₁₆-inch, ⅝-inch, ¾-inch and 1-inch, etc. These bit diameters and the router base diameter are presently common for router use. The length 8 and the width 10 of each pair of identical setback gauges will vary according to the cutting diameter of the router bit.

The set of setback gauges may be stored in a suitable box or container and may be indexed by the index tabs 30 for separating the pairs of setback gauges. Preferably, as shown in FIG. 9B, each index tab 30 will include index tab identification means 31, provided on an upper square projection 32, to identify the corresponding pair of setback gauges which will be stored adjacent to the index tab. The size of the index tabs 30 will be proportional to the size of the setback gauges so that the tab portion of the index tabs 30 will clearly be visible above the top edges of the stored setback gauges.

Figure 10:
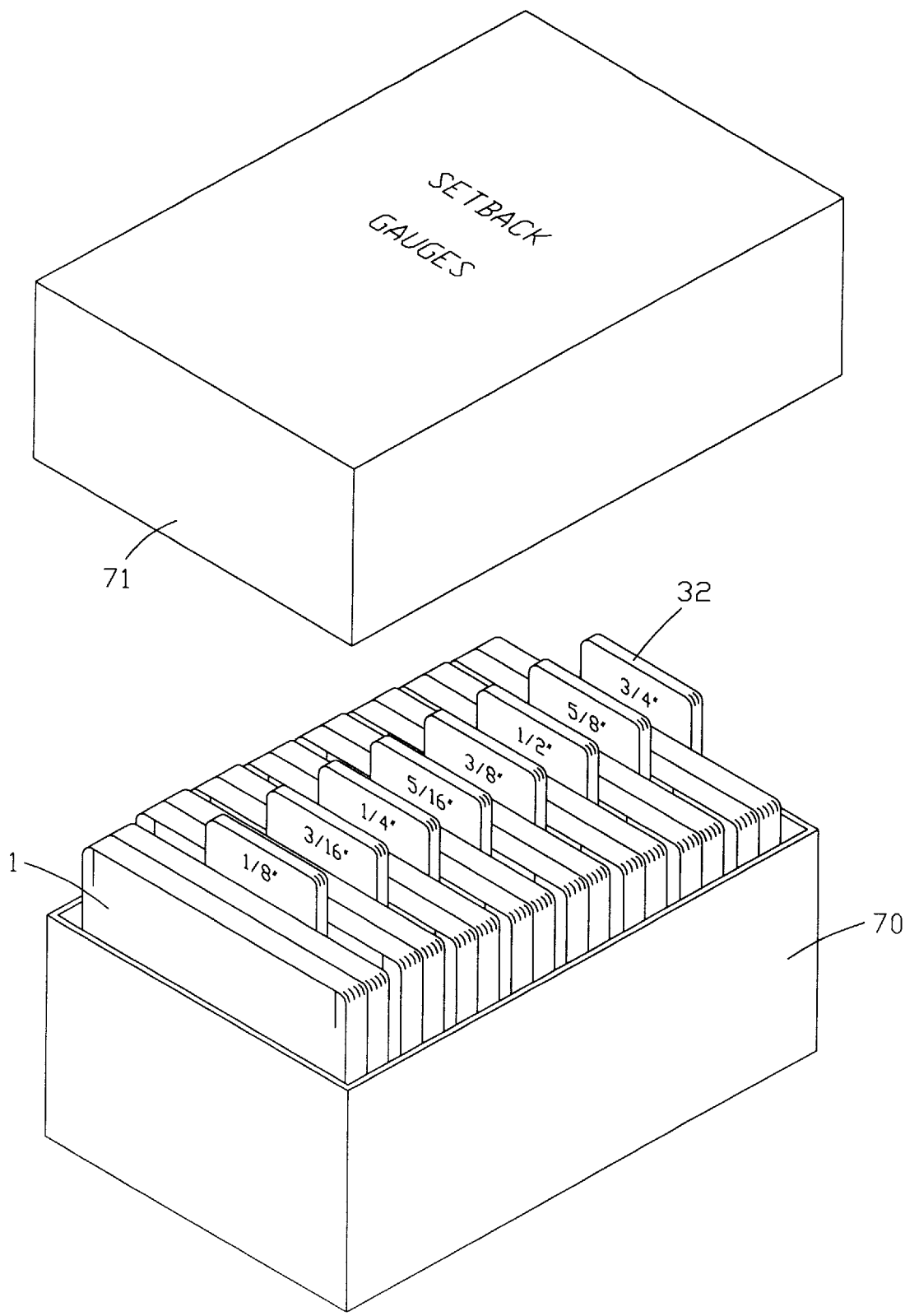
FIG. 10 shows a perspective view of a box containing a paired set of setback gauges separated by index tabs.

Thus, as shown in FIG. 10 a compact, conveniently boxed set of gauges would be readily available in a workshop to quickly, easily, and accurately position straightedges and fences into the required setback positions for all kinds of cuts using various router bit sizes. The box 70 includes a series of index tabs 30 (the upper square projections 32 of which are shown), with the respective pair of identical setback gauges 1 located in front of each tab. Preferably, the tabs 30 and gauges are sorted by router bit size, and the index tabs 30 are sized to be larger than the largest setback gauge 1, so that all the projections 32 are visible. Preferably, a box cover 71 is also provided.

Figure 11A:
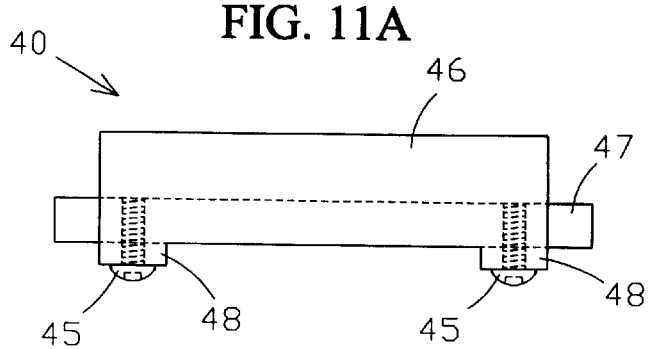
FIG. 11A shows a top view of a first embodiment of an anti-parallax attachment.
Figure 11B:
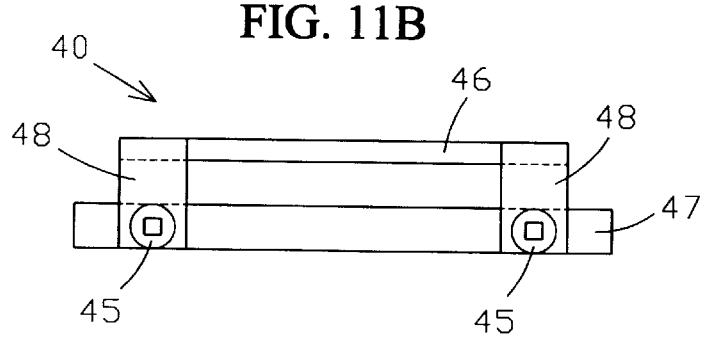
FIG. 11B shows a front view of the first embodiment of an anti-parallax attachment.
Figure 11C:
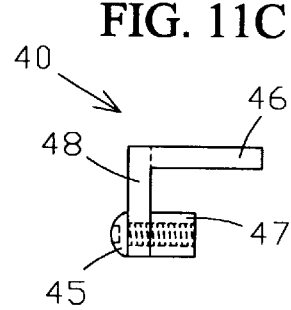
FIG. 11C shows a side view of the first embodiment of an anti-parallax attachment.

FIG. 11A shows a top view of a first embodiment of an antiparallax attachment; shown also in FIGS. 11B and 11C. An anti-parallax attachment is required when a cutting line on a workpiece is positioned lower than the plane on the workpiece on which the router base will slide when in use so that a setback gauge cannot be aligned directly onto the cutting line. As detailed below, the anti-parallax attachment can be used with the setback gauges being in either the inside cut or outside cut directions.

The first embodiment of an anti-parallax attachment is indicated at 40 and is intended to clip onto an edge of a setback gauge 1; The anti-parallax attachment 40 includes an upper section 46 and vertical flanges 48 which are attached to the upper section 46. A lower section 47 is adjustably fastened onto the vertical flanges 48 by suitable means, such as screw fasteners 45. This enables the attachment 40, to be readily clipped onto a setback gauge, with the upper section 46 and lower section 47 snugly abutting opposite faces of the setback gauge.

Figure 12:
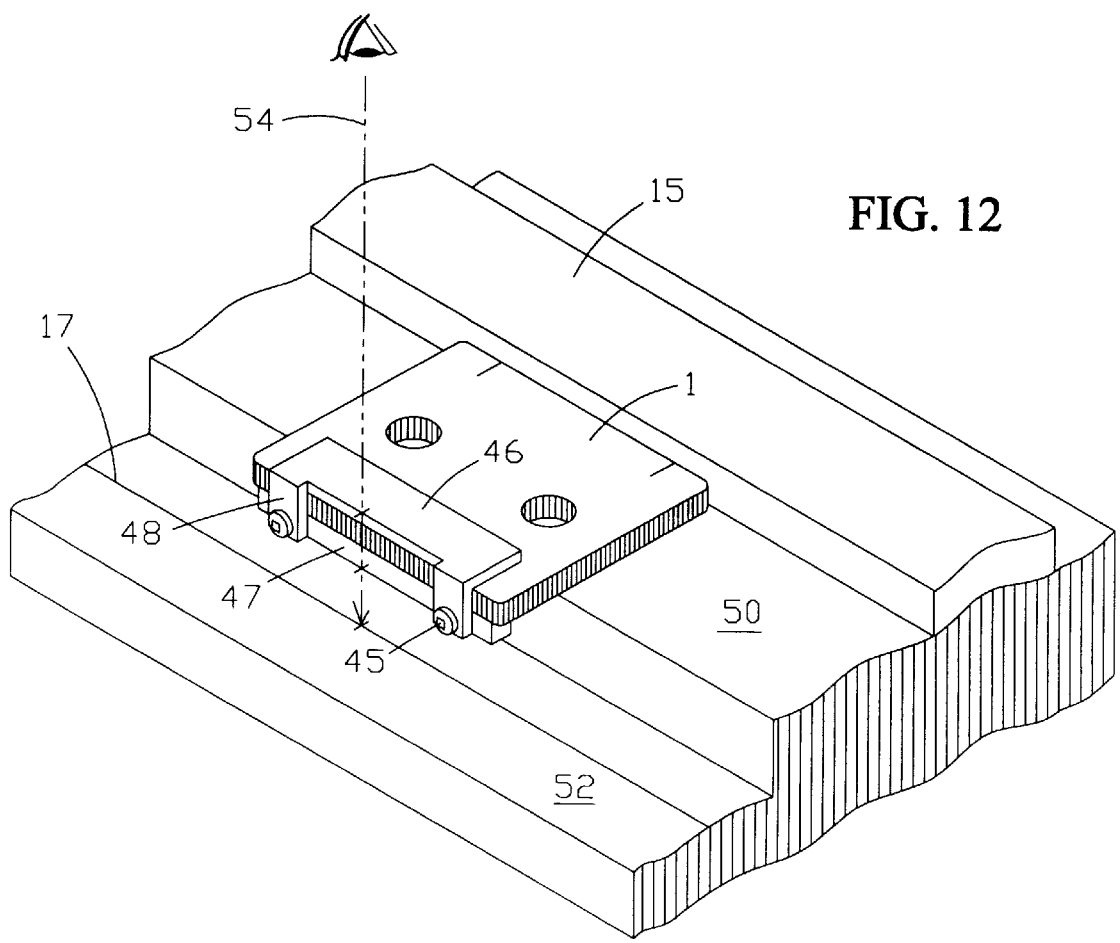
FIG. 12 shows a perspective view of the first embodiment of an anti-parallax attachment attached to a setback gauge, and being used to line up a cutting line on a workpiece, which cutting line lies lower than the plane on the workpiece for the router base.

Now referring to FIG. 12, when the first embodiment of an anti-parallax attachment is clipped onto a setback gauge 1 it is placed on a plane or surface 50 on which the router will slide. This plane or surface 50 is above a lower surface 52 where the desired cutting line 17 lies. The anti-parallax attachment 40 is viewed from above, as shown in FIG. 11A, so that a perpendicular line of sight is provided over a cutting line 17. This perpendicular line of sight 54 (FIG. 12) is provided down to cutting line 17. This perpendicular line of sight 54 will be accurately aligned, i.e. so it is perpendicular to the plane 52, by the front edge of the upper section 46, the outside edge of the setback gauge 1, and the front edge of the lower section 47, in the region that lies between the vertical flanges 48. This will help to minimize any parallax errors which could cause an incorrect placement of the straightedge 15.

While this is one embodiment of an anti-parallax attachment which clips directly onto a setback gauge 1 to vertically extend the edge of the setback gauge, similar attachments which vertically extend the edge of the setback gauge may be used for the purpose of parallax correction.

Figure 13A:
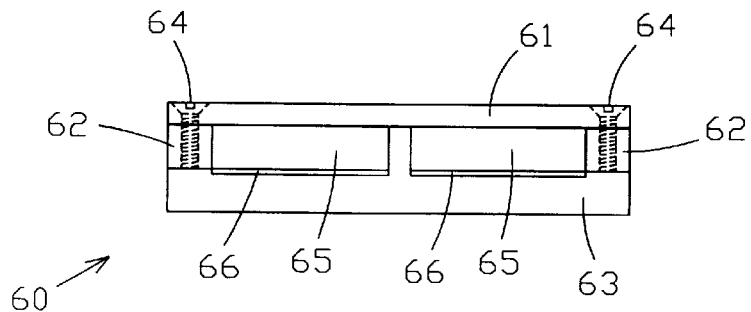
FIG. 13A shows a top view of a second embodiment of an anti-parallax attachment.
Figure 13B:
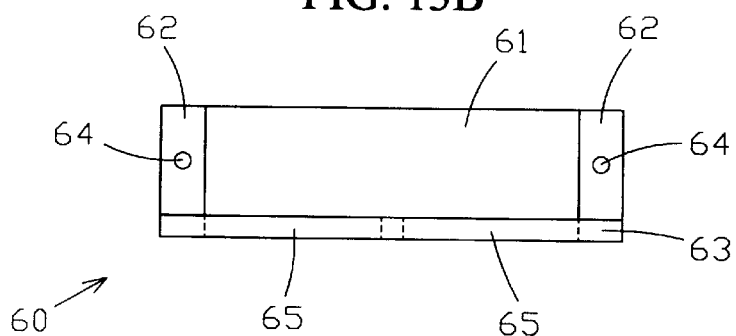
FIG. 13B shows a front view of the second embodiment of an anti-parallax attachment.
Figure 13C:
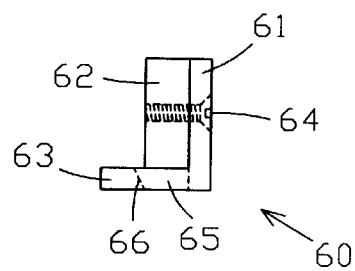
FIG. 13C shows a side view of the second embodiment of an anti-parallax attachment.

FIG. 13A shows a top view of a second embodiment of an anti-parallax attachment indicated at 60. This second attachment 60 comprises a back-part 61, vertical contact posts 62, and a base-part 63. The back-part 61 is orthogonally attached to the base-part 63. The front sides of contact posts 62, which are the preferred points of contact with a setback gauge, are orthogonal to the bottom of base-part 63. The contact posts 62 may be suitably fastened to the back-part 61 by any number of means including second screw fasteners 64. The base-part 63 of this embodiment includes at least one window opening 65 with a straight, chamfered front edge surface 66. The bottom edge of the chamfered front edge surface 66 is exactly in line with the front side of the contact posts 62. The bottom of the chamfered front edge surface 66 is also parallel to the back side of back-part 61.

Figure 14:
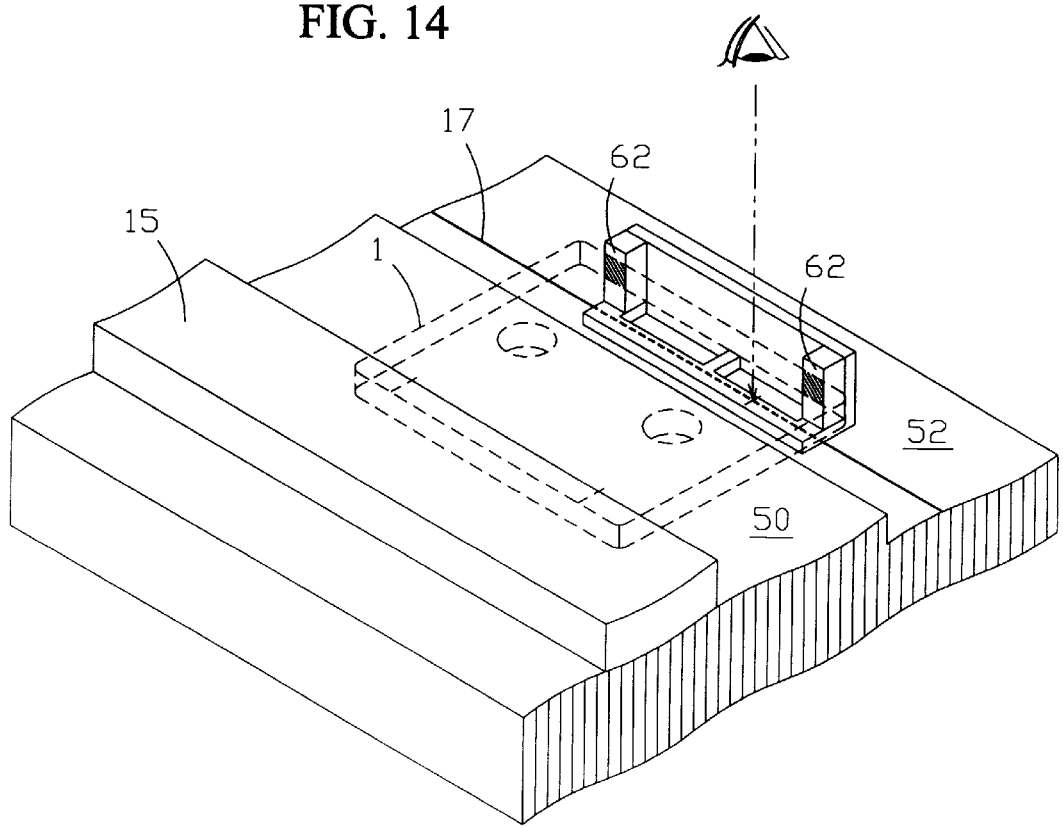
FIG. 14 shows a perspective view of the second embodiment of an anti-parallax attachment placed on a workpiece where the cutting line lies lower on the workpiece than the plane on the workpiece for the router base.

As for the arrangement in FIG. 12, and as shown in FIG. 14, it is necessary to have the router traverse or slide across a plane or surface 50 above a plane or surface 52 on which a desired cutting line is located. Note that, here, it is necessary for the surface 52 to be planar, while this is not essential in FIG. 12.

Now referring to FIG. 14, in use, the anti-parallax attachment 60 is placed on the surface 52, and the bottom edge of the chamfered front edge surface 66 is aligned exactly over the cutting line 17. A setback gauge 1 is then placed on the surface 50 and is butted against the front sides of the contact posts 11 so that an edge of setback gauge 1 is vertically positioned exactly over the cutting line on the workpiece, thus avoiding any parallax errors that could cause an incorrect placement of the straightedge 15. The setback gauge 1 will butt up against the contact posts 11 at various heights, depending on how much lower the plane 52 for the cutting line 17 is, compared to the plane 50 on which the router base lies in use. Alternatively, this type of anti-parallax attachment can be turned around if desired so that the bottom of the back or outer side of back-part 61 is first aligned next to the cutting line and a setback gauge 1 is butted up against the back side of back-part 61. Any similar device which vertically extends the cutting line may be used for the purpose of parallax correction.

While the particular embodiment of the present invention has been illustrated and described, it would be obvious to those skilled in the art that various other changes and modifications can be made without departing from the spirit and scope of the invention. It is therefore intended to cover in the intended claims all of such changes and modifications that are within the scope of this invention.

For example, the setback gauges may be used to correctly position right-angle fences, or any other angle fences comprising two straightedges.

I claim:

1. A setback gauge for use with a router, a fence and a workpiece, said router having a base, an edge on the base for guiding the router, and a router bit extending out from said base for rotation about a router axis, said setback gauge comprising a substantially rectangular plate wherein the length of said rectangular plate between first edges of the rectangular plate defines a first setback distance and the width of said rectangular plate between second edges of the rectangular plate defines a second setback distance, said first setback distance being equal to the distance from the router axis to the edge of said base plus one-half of the cutting diameter of the router bit, and defining the setback distance for cuts inside a cutting line, and said second setback distance being equal to the distance from the router axis to the edge of said base less one-half of the cutting diameter of the router bit, for defining the setback distance for cuts outside a cutting line.

2. A setback gauge as claimed in claim 1, wherein said setback gauge includes identification means for identifying the cutting diameter of a router bit with which said setback gauge is to be used.

3. A setback gauge as claimed in claim 2, wherein said identification means comprises an alphanumeric identification means for identifying the cutting diameter of a router bit with which said setback gauge is to be used.

4. A setback gauge as claimed in claim 3 wherein the identification means include supplemental identification means comprising at least one circular hole having a diameter substantially equal to the cutting diameter of the router bit with which said setback gauge is to be used.

5. A setback gauge as claimed in claim 4, which includes a plurality of holes, wherein said holes are positioned so as to indicate the orientation of said setback gauge.

6. A setback gauge as claimed in claim 5, wherein said setback gauge includes corner lines parallel to and one router bit cutting diameter away from the first edges.

7. A setback gauge as claimed in claim 1, in combination with an anti-parallax attachment for workpieces which lie at a lower horizontal plane than the horizontal plane on which the router base will lie in use, said anti-parallax attachment comprising one of:
   (a) an attachment which attaches to the setback gauge and which vertically extends one edge of said setback gauge; and
   (b) an attachment which is placed on the workpiece to vertically extend the cutting line at least to the horizontal plane on which said router base will lie in use.

8. A set of setback gauges comprising a plurality of setback gauges as claimed in any one of claims 1–6 for use with routers having a common dimension for the distance between the router axis and the edge of the router base, wherein the first setback distance and the second setback distance vary according to the cutting diameter of the router bit, and wherein said set of setback gauges includes setback gauge sizes for common router bit cutting diameters.

9. A set of setback gauges claimed in claim 8 wherein there is a pair of setback gauges for each size of setback gauge.

10. A set of setback gauges as claimed in claim 9, which includes a container for the setback gauges and a plurality of index tabs for separating the setback gauges, wherein said setback gauges are stored in the container in pairs and separated by the index tabs with each index tab associated with one pair of setback gauges, the index tabs showing the router bit cutting diameter for each associated pair of setback gauges at the top of each tab.

11. A method of performing cuts on a workpiece using a router, said router having a base, an edge on the base for guiding the router, and a router bit extending out from said base for rotation about a router axis, said method comprising the steps of:
   (i) providing a setback gauge, said setback gauge comprising a substantially rectangular plate wherein the length of said rectangular plate between first edges of the rectangular plate defines a first setback distance and the width of said rectangular plate between second edges of the rectangular plate defines a second setback distance, said first setback distance being equal to the distance from the router axis to the edge of said base plus one-half of the cutting diameter of the router bit, for defining the setback distance for an inside cut inside a cutting line, and said second setback distance being equal to the distance from the router axis to the edge of said base less one-half of the cutting diameter of the router bit, for defining the setback distance for an outside cut outside a cutting line;
   (ii) selecting a setback gauge corresponding to the cutting diameter of said router bit and the router base dimension;
   (iii) locating a cutting line on the workpiece and selecting which of the inside cut and the outside cut is to be made;

(iv) positioning one of: one first edge of said setback gauge on the cutting line for the inside cut; and one second edge of said setback gauge on the cutting line for the outside cut;

(v) butting a straightedge against a respective first or second edge opposite said one first or one second edge positioned on said cutting line;

(vi) clamping down or otherwise securing said straightedge on said workpiece so as to provide a stable guide for said router;

(vii) removing the setback gauge; and (viii) traversing the router along the cutting line, while maintaining the router base against the straightedge, to make the selected one of the inside cut and the outside cut.

12. A method of performing a cut on a workpiece using a router, said router having a base, an edge on the base for guiding the router, and a router bit extending out from said base for rotation about a router axis, said router bit blade cutting in a clockwise direction, said method comprising the steps of:

(i) locating a cutting line on a workpiece;

(ii) measuring a distance equal to the distance from the router axis to the edge of said base plus one-half of the cutting diameter of the router bit, for defining the setback distance for inside cuts inside the cutting line;

(iii) positioning a straightedge at the distance measured in step (ii) and clamping down or otherwise securing said straightedge on said workpiece so as to provide a stable guide for said router, said straightedge having a guiding edge;

(iv) traversing the router along the cutting line, while maintaining the router base against the straightedge, and in a direction that is left-to-right when viewing the guiding edge of the straightedge, so as to produce an inward-cutting action along said cutting line.

13. A method as claimed in claim 11 or 12, which additionally includes providing the router with a substantially cylindrical router bit, and making successive cuts in the workpiece, until a complete, parallel sided cut is made through the workpiece.

14. A method as claimed in claim 12, which comprises providing a workpiece formed from wood and routing the end grain of the wood to form one of a tongue, a tenon and a rabbet, for forming joint.

* * * * *